Patented Feb. 28, 1933

1,899,582

UNITED STATES PATENT OFFICE

HERMANN MARK AND MANFRED DUNKEL, OF MANNHEIM, AND ERNST ROELL, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

CARRYING OUT FRIEDEL CRAFTS AND SIMILAR CONDENSATION REACTIONS WITH NONAROMATIC COMPOUNDS

No Drawing. Application filed February 28, 1929, Serial No. 343,556, and in Germany March 5, 1928.

Hitherto the Friedel crafts and similar condensation reactions could only be carried out with compounds of the aromatic series.

We have now found that aliphatic hydroaromatic or aromatic radicals can be introduced with good results into saturated compounds of the aliphatic, namely of the aliphatic open chain and hydroaromatic series, free from halogen, by treating the said compounds with compounds of the aliphatic, hydroaromatic or aromatic series containing halogen in the presence of metal halides in a closed vessel at a temperature above the boiling point at atmospheric pressure of a liquid organic ingredient of the reaction mixture. The valve of the pressure depends on the reaction components employed and varies accordingly from about 2 to about 100 atmospheres depending on the temperature applied.

In accordance with the present invention substituents of the aforesaid nature which hitherto could only be introduced into substances of the aromatic series can be introduced into saturated aliphatic compounds free from halogen already mentioned, such as aliphatic or hydroaromatic compounds, cyclo-polymethylenes, ethers and the like, by means of alkyl halides, halides of mono- or polybasic acids and the like with the aid of the more or less volatile metal halides such as aluminium chloride or bromide, iron chloride and the like. The process can also be carried out in the presence of diluents which are not attacked such as carbon tetrachloride, chloroform or similar substances containing halogens which themselves only permit of further halogenation with difficulty.

The further examples will further illustrate the nature of the said invention but the invention is not restricted to these examples. The parts are by weight.

Example 1

An autoclave is charged with 86 parts of a petroleum fraction which boils between 60° and 70° centigrade, 98 parts of phosgene and about 133 parts of aluminium chloride and is heated to 100° centigrade. A quantitative conversion into ketones of the polymethylene and paraffin series occurs.

Example 2

A strongly cooled autoclave is charged with n-butane and the double compound of phosgene and aluminium chloride. It is then heated to 90° centigrade and kept at this temperature for 6 hours. After cooling, the pressure is released and the reaction mixture is worked up in the usual manner. A yellow oil with an aromatic smell is obtained which boils between 120° and 150° centigrade at 15 millimetres pressure (mercury gauge).

Example 3

78 parts of acetyl chloride and 100 parts of hexane (e. g. with a slight excess above the quantity stoichiometrically required) are fed into an autoclave together with the amount of aluminium chloride calculated for the formation of its double compounds with the acetylchloride and then heated for 2 hours to 100° C. The product obtained consists mainly of ketones of the polymethylene series, inter alia octanone.

Example 4

40 parts of ethyl chloride and 100 parts of hexane are heated in an autoclave together with the calculated quantity of aluminium chloride for 2 hours at 100° C. The reaction product is worked up in the usual manner and higher hydrocarbons, particularly octane, can be isolated therefrom.

What we claim is:—

1. The process of carrying out condensation reactions with non-aromatic compounds which comprises treating an aliphatic saturated hydrocarbon with a halogenated oxygen-bearing organic compound in the presence of a volatile metal halide in a closed vessel and at a temperature above the boiling point at atmospheric pressure of the non-aromatic ingredient of the reaction mixture but below the temperature at which the reaction components are cracked.

2. The process of carrying out condensation reactions with non-aromatic compounds which comprises treating an aliphatic saturated hydrocarbon with a halogenated oxygen-bearing organic compound in the presence of aluminium chloride in a closed vessel and at a temperature above the boiling point at atmospheric pressure of the non-aromatic ingredient of the reaction mixture but below the temperature at which the reaction components are cracked.

3. The process of carrying out condensation reactions with non-aromatic compounds which comprises treating a mineral oil fraction consisting of saturated constituents with a halogenated oxygen-gearing organic compound in the presence of aluminium chloride in a closed vessel and at a temperature above the boiling point at atmospheric pressure of the mineral oil fraction but below the temperature at which the reaction components are cracked.

4. The process of carrying out condensation reactions with non-aromatic compounds which comprises treating a mineral oil fraction consisting of saturated constituents with phosgene in the presence of aluminium chloride in a closed vessel and at a temperature above the boiling point at atmospheric pressure of the mineral oil fraction but below the temperature at which the reaction components are cracked.

5. The process for carrying out condensation reactions with non-aromatic compounds which comprises treating a petroleum fraction boiling between 60° and 70° C., with phosgene in the presence of aluminium chloride in a closed vessel, at a temperature of about 100° C.

6. The process for carrying out condensation reactions with non-aromatic compounds which comprises treating n-butane with phosgene in the presence of aluminium chloride in a closed vessel at a temperature of about 90° C.

7. The process for carrying out condensation reactions with non-aromatic compounds which comprises treating hexane with acetyl chloride in the presence of aluminium chloride in a closed vessel, at a temperature of about 100° C.

8. The process for carrying out condensation reactions with non-aromatic compounds which comprises treating hexane with ethyl chloride in the presence of aluminium chloride in a closed vessel at a temperature of about 100° C.

In testimony whereof we have hereunto set our hands.

HERMANN MARK.
MANFRED DUNKEL.
ERNST ROELL.